US012784956B2

(12) United States Patent
Turvey

(10) Patent No.: US 12,784,956 B2
(45) Date of Patent: Nov. 3, 2026

(54) INDUCTOR

(71) Applicant: ROLLS-ROYCE PLC, London (GB)

(72) Inventor: Simon Turvey, Birmingham (GB)

(73) Assignee: ROLLS-ROYCE plc, London (GB)

( * ) Notice: Subject to any disclaimer, the term of this patent is extended or adjusted under 35 U.S.C. 154(b) by 804 days.

(21) Appl. No.: 17/987,376

(22) Filed: Nov. 15, 2022

(65) Prior Publication Data

US 2023/0170125 A1 Jun. 1, 2023

(30) Foreign Application Priority Data

Dec. 1, 2021 (GB) ...................................... 2117336

(51) Int. Cl.
*H01F 17/06* (2006.01)
*H01F 27/28* (2006.01)
*H01F 27/30* (2006.01)

(52) U.S. Cl.
CPC ....... *H01F 17/062* (2013.01); *H01F 27/2895* (2013.01); *H01F 27/306* (2013.01)

(58) Field of Classification Search
CPC ........ H01F 17/06; H01F 17/062; H01F 30/16; H01F 2038/305; H01F 27/2895
USPC .......................................................... 336/229
See application file for complete search history.

(56) References Cited

U.S. PATENT DOCUMENTS 5,959,846 A 9/1999 Noguchi et al.
11,581,121 B1 * 2/2023 Martinez ............... H01F 27/303
2003/0011041 A1 1/2003 Acosta et al.
2003/0048168 A1 * 3/2003 Schutten ................. H01F 30/16 336/229
2007/0090916 A1 * 4/2007 Rao ....................... H01F 17/062 336/229
2010/0283569 A1 11/2010 Lee et al.
2012/0098509 A1 4/2012 de Rochemont
2015/0310982 A1 10/2015 Kostelnik et al.
2016/0260538 A1 * 9/2016 Tanaka ................ H01F 27/2895
2017/0004914 A1 * 1/2017 Nishide ................... H01F 27/24
2018/0090251 A1 * 3/2018 Kudo ...................... C22C 38/12
2018/0350501 A1 * 12/2018 Hasegawa ............... H01F 17/06
2019/0148048 A1 * 5/2019 Kittilä ................... H01F 17/062 336/229

(Continued)

FOREIGN PATENT DOCUMENTS

CN 110911128 A * 3/2020 ......... H01F 27/2876
DE 4221769 C1 * 1/1994 ......... H01F 27/2804

(Continued)

OTHER PUBLICATIONS

Apr. 17, 2023 Search Report issued in Europeant Patent Application No. 22207232.4.

(Continued)

*Primary Examiner* — Tszfung J Chan
(74) *Attorney, Agent, or Firm* — Oliff PLC

(57) ABSTRACT

A filter inductor for a power generation convertor; the filter inductor comprising a toroidal connector and a conductive winding having a first connector and a second connector positioned at each end of the winding, and wherein the conductive winding being formed from at least first and second winding segments which are connected to each other so as to form a continuous winding around the toroidal connector that extends form the first connector to the second connector.

19 Claims, 4 Drawing Sheets

(56) References Cited

U.S. PATENT DOCUMENTS

| | | | | |
|---|---|---|---|---|
| 2019/0272948 | A1* | 9/2019 | Hwang | C09D 7/40 |
| 2019/0295767 | A1 | 9/2019 | Ricco | |
| 2020/0111599 | A1* | 4/2020 | Xu | H02M 7/537 |
| 2021/0358672 | A1* | 11/2021 | Tamura | H01F 27/24 |

FOREIGN PATENT DOCUMENTS

| | | | | |
|---|---|---|---|---|
| WO | WO-2006053862 | A1 * | 5/2006 | H01F 41/08 |
| WO | WO-2011014200 | A1 * | 2/2011 | H01F 27/2804 |
| WO | WO-2014115667 | A1 * | 7/2014 | H01F 3/10 |
| WO | WO-2018118839 | A1 * | 6/2018 | H01F 30/16 |
| WO | WO-2020087972 | A1 * | 5/2020 | H01F 41/046 |
| WO | WO-2021136593 | A1 * | 7/2021 | H05K 7/209 |
| WO | WO-2023042512 | A1 * | 3/2023 | H01F 17/06 |

OTHER PUBLICATIONS

May 6, 2022 Search Report issued in Great Britain Patent Application No. GB2117336.4.

* cited by examiner

INDUCTOR

This specification is based upon and claims the benefit of priority from UK Patent Application Number 2117336.4 filed on 1 Dec. 2021, the entire contents of which are incorporated herein by reference.

BACKGROUND

Overview of the Disclosure

The disclosure relates to a filter inductor for power generation having a two-piece connectable winding. Furthermore, the disclosure relates to a method of fabricating a filter inductor having a multi-sectional connectable winding.

Background of the Disclosure

Inductors are used in a wide range of electronic technologies. They are commonly found in modern power electronics because devices and equipment are operating at higher switching speeds. Inductors are also used in power supply circuits to block out alternating current in a circuit by limiting the rate of change of the current in a specified frequency range, whilst at the same time allowing the passage of low frequency alternating current (AC) and direct current (DC) to pass. They can also be used to filter out ripples in the voltage and current from power supplies. Inductor systems are also sometimes called a choke.

Filter inductors for next generation power converters need to be as physically small and light as possible whilst at the same time dissipating the least power in terms of losses. Part of the problem with filter inductors is that using the strip or round wire which is difficult to wind around the core. The process of winding the wire or the strip around the core limits the "fill-factor"; this limitation of the fill factor results in the requirement for additional heat transfer elements to link the copper turns to a cold plate. This is especially the case when using a toroidal core, which can be even more of an issue for e-core transformers because the copper is less accessible. This is of interest because the use of toroidal core inductors is attractive because the toroid shape results in an inductor which performs like a shielded component. There is a need to improve the fill factor and to provide an improved filter inductor.

SUMMARY OF THE DISCLOSURE

According to a first aspect of the disclosure there is provided a filter inductor for a power generation convertor; the filter inductor comprising a toroidal conductor and a conductive winding having a first connector and a second connector positioned at each end of the winding, and wherein the conductive winding comprising at least first and second winding segments which are connected to each other so as to form a continuous winding around the toroidal connector that extends form the first connector to the second connector.

The inductor ay be mounted upon a cold plate trough the connectors.

Electrodes may be provided on the cold plate and wherein the electrodes are electrically coupled to at least the first and second connectors of the inductor.

The winding may be made of aluminium or copper.

The core material may be made of MMP (Metal Powder) Glassy Metal, Silicon Iron, Nickel Iron.

The spacing may be between the winding and the core is between 0.25 and 1.5 mm.

The first and second connectors may be contact pads, which are provided upon the first winding segment.

The connectors may be contact pads. The contact pads may be shaped to be round pads.

The inductor may be provided with stabilising pads.

There may be a plurality or winding segments formed and linked to form multiple magnetically coupled inductors.

Additional thermal and mechanical connections may be provided. The presence of the mechanical and thermal connections is to improve heat transport.

The surfaces of the overall component may be shaped to the fill factor. This increases the space efficiency of the winding to increase its performance.

The surfaces of the component may be shaped and insulated to allow additional thermal interfaces to be provided.

According to a second aspect of the disclosure there is provided a method of forming a filter inductor for a power generation convertor, the method comprising three-dimensional printing a first winding segment having at least a first connector, positioning a toroidal conductor within the first segment, then adding at least a second winding segment to contact the first winding segment so as to form a continuous winding around the toroidal conductor, and wherein the first or second winding segment is provided with a second connector.

The addition of the at least second winding segment may be done via three-dimensional printing of the at least second winding segment directly onto the first winding segment and the conducting toroidal core.

The addition of the at least second winding segment may be done via the addition of a preformed three dimensional printed at least second winding segment onto the first winding segment and the conducting toroidal core.

The first and the at least second winding segments may be formed from aluminium or copper.

The first winding segment may be printed on a cold plate.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE FIGURES

Embodiments will now be described by way of example only, with reference to the Figures, in which.

DETAILED DISCLOSURE

Aspects and embodiments of the present disclosure will now be discussed with reference to the accompanying figures. Further aspects and embodiments will be apparent to those skilled in the art.

Figure 1:
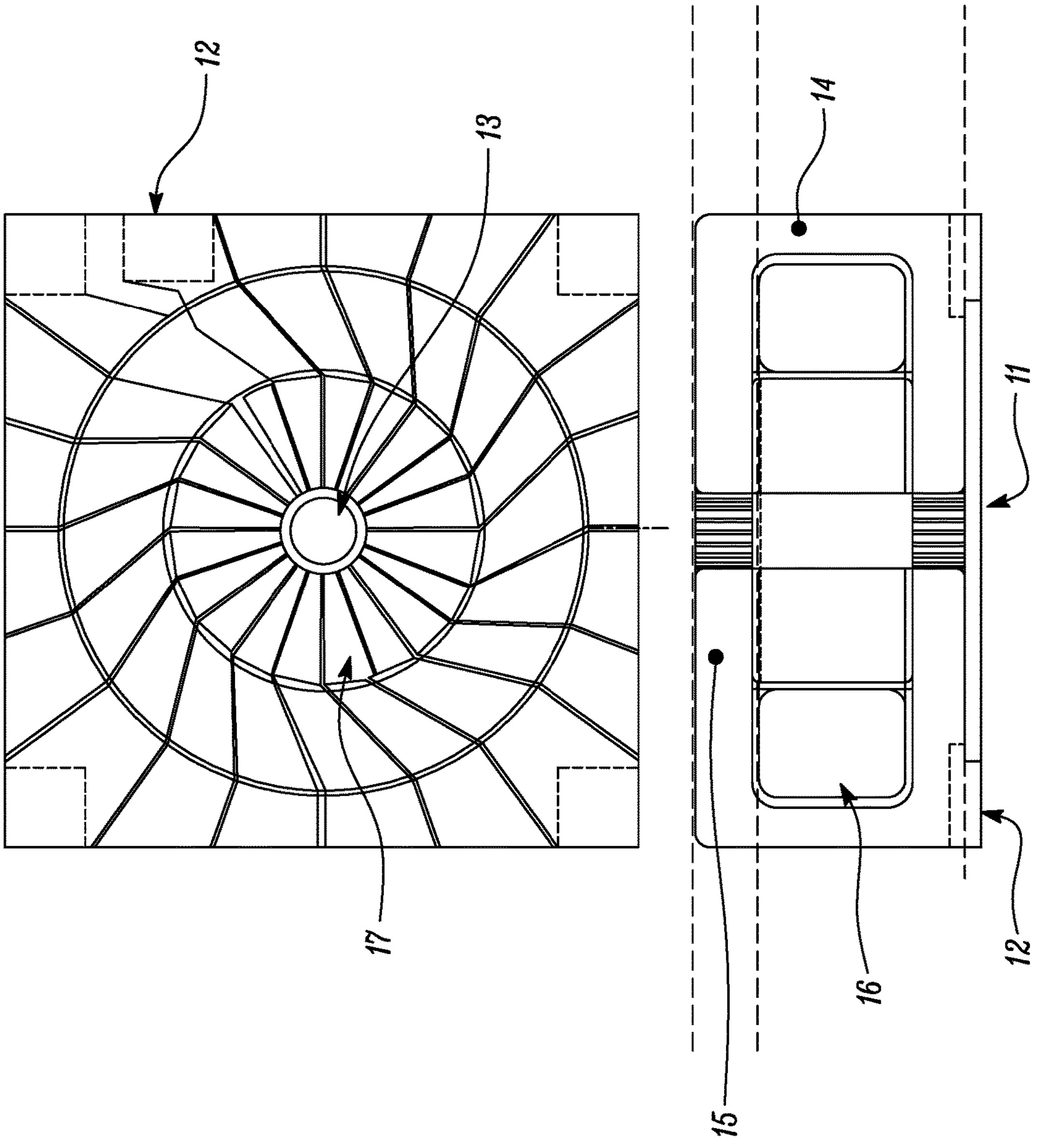
FIG. 1 presents a plan view and a cut through image of the inductor according to the present disclosure.

FIG. 1 shows an example of the present disclosure. In this a cold plate 11 is used as the base onto which the inductor is mounted. The use of the cold plate allows for heat losses to be transported away from the inductor coil. In this case heat is produced as a loss from the operation of the inductor. The presence of a heat plate is beneficial to the operation of the inductor as the operating temperature affects the performance of the inductor. Therefore, the presence of a cool plate allows for improved performance of the device. Furthermore, it also makes the inductor more compatible with the organic insulation materials and solder or other joining processes. The presence of the cold plate also allows for electrical contacts 12 to be added; thus, allowing the inductor to be easily connected to other components within the circuit. In particular, the presence of the electrodes can allow for easy connection to PCB busbars. The connection with busbars allows for low inductance power switching stages by providing a surface mount connection. Central mechanical fixing may also be used to connect the inductor to its associated electronic connections. Furthermore, the use of a central mechanical fixing is also beneficial in situations where shock and vibration would otherwise cause the component to detach form the board. Onto the surface of the cold plate a mechanical support 13 may be created. The mechanical support can be used as a point from which the first winding segment 14 can be created. The first winding segment contains the portion of the full winding that is to pass along the base of the core. The first winding segment may also possess legs that extend away from the surface of the first winding segment; this upward extension may extend to the full or a partial height of the core. The core may be a toroidal core 16. The core can also be any other suitable shaped inductor core. Furthermore, due to the advantages of processing the core may be of an unusual design such as a laminated rectangle or a "C" shape core, or any other desirable shape. With the first winding segment formed the core is then positioned on to the first winding segment. A second winding segment 15 is either created around the core or separate from around the core and then positioned on the first winding segment so as to form a continuous winding around the core. The windings 17 are shown to have 18 turns however the number of turns in the winding can be adjusted to suit the requirements of the invertor. The core can be made from any suitable materials such as a Metal Powder Core MPP. These offer a wide range of compositions that allow energy storage to be balanced against losses. Alternatively, Ferrite materials, or amorphous materials may be used. A cut away section of the inductor is shown in below the plan view of the inductor. The cut away shows the core 16 with the windings 17 being positioned around the core. The cut away also shows the inductor having electrical contacts on the outer edge of the inductor device that contact with the electrode on the cold plate. The configuration of device on the chip/substrate will depend upon the heat and power characteristics of the device.

Figures 2A, 2B:
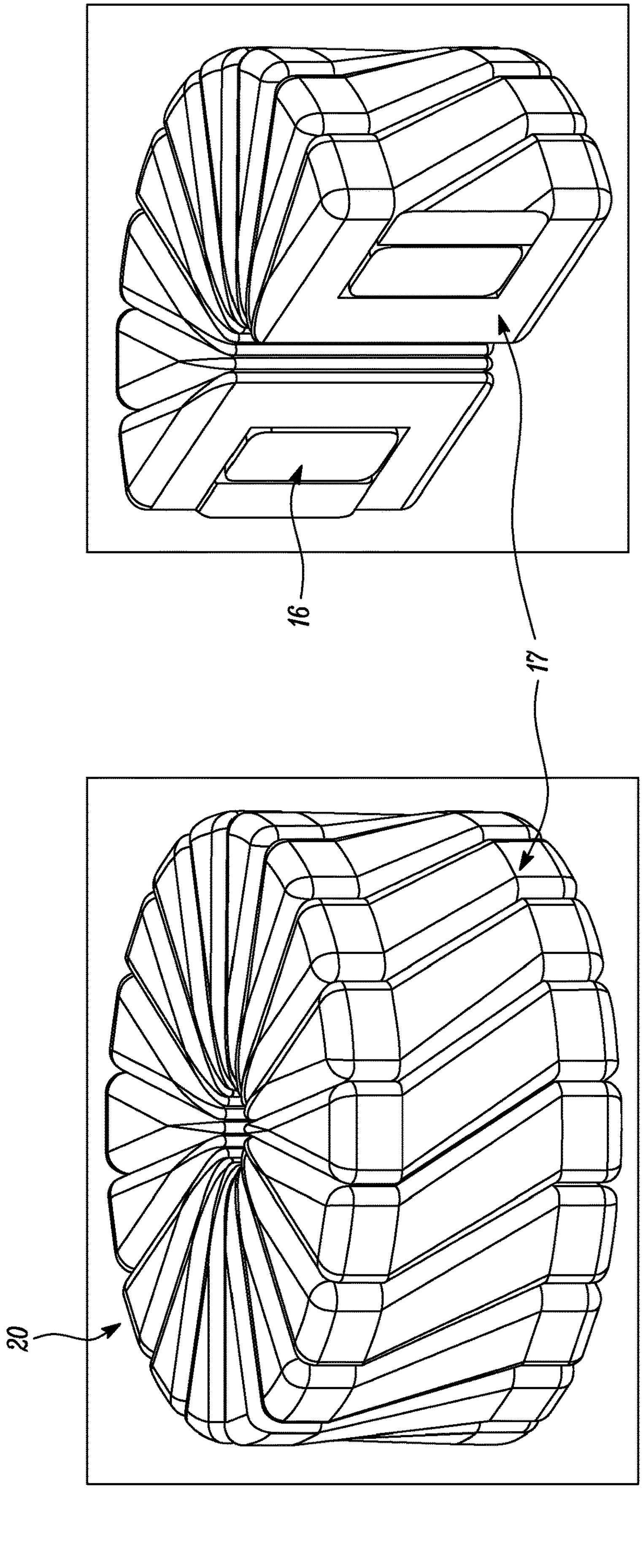
FIG. 2*a* is three-dimensional model of a toroidal inductor of the present disclosure.
FIG. 2*b* is a cut away of a three-dimensional model of the toroidal inductor of the present disclosure.

FIG. 2*a* shows a three-dimensional model of the inductor according to the present disclosure. The device of FIG. 2*a* differs from FIG. 1 in that the inductor in FIG. 1 has a square cross-sectional profile, whilst that of FIG. 2*a* has a toroidal cross-sectional profile. In this example, the inductor 20 has a winding 17 comprising 18 turns surrounding a toroidal core 16. As can be seen the windings of the first and second winding segments are shaped such that the windings are narrower towards the centre of the toroidal core. Although FIG. 2*a* shows the inductor having 18 turns the inductor can be designed with any suitable number of turns. In order to increase the number of turns the strips or wires may be made to be thinner at the centre. Alternatively, a torpid having a larger core may be used to accommodate a greater number of windings. Similarly, although the winding is shaped such that the outer winding has a greater width than the inner winding it is possible to form the windings such that the windings have a continuous cross-section and the core with an optimum internal to external dimensions as well. The ability of being able to design an inductor within a given mechanical outline is a benefit of the present disclosure. Thus, whilst generally uniform shapes are presented, for example a rectangular shaped footprint with a circular toroidal core would encourage the use of narrower turn in the rectangles longer dimension to maintain the desirable uniform cross section for each turn. In FIG. 2*a* the strip windings are shown to have bevelled edges. Alternatively, to the use of bevelled edges the windings may be chamfered. Another alternative has the edge of the windings being a right-angled corner. The presence of the rounding or chamfering allows for a weight reduction of the inductor device. FIG. 2*b* shows a cut away of the inductor that is shown in FIG. 2*a*. In the cut away image it can be clearly seen how the winding is positioned around the core of the inductor. The first and second winding segments are connected together to form a continuous winding that encases the toroidal core. FIG. 2*a* shows that the internal windings are positioned to extend parallel to the axis of the toroidal core. The outside of the winding is shown to be formed at an angle to join the next winding. Using such a configuration allows for the windings to provide a greater coverage of the toroidal core. The windings do not need to follow this configuration but can spiral around the core. Although the discussion above is related to an inductor being formed of two parts the inductor can be made from more than two sections and joined together to form the linked inductor shape.

Figure 3:
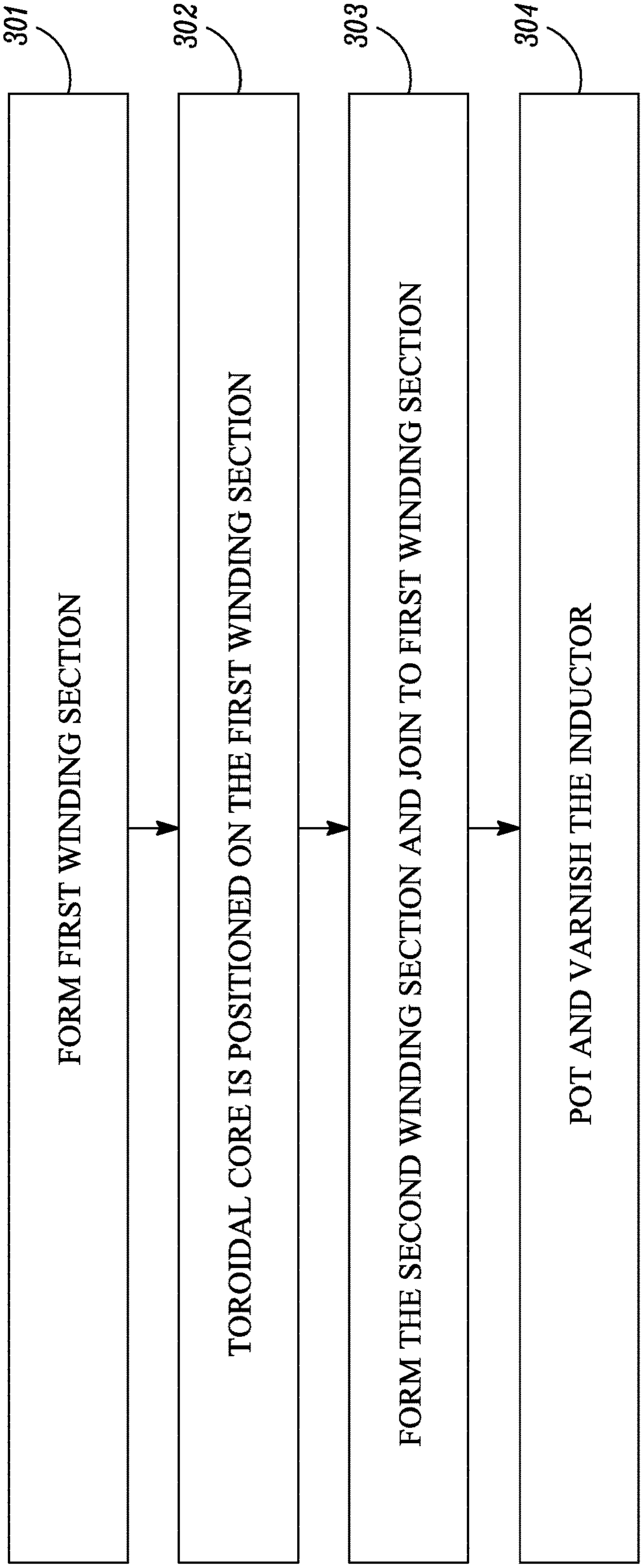
FIG. 3 presents the method steps of manufacturing the inductor according to the present disclosure.

FIG. 3 shows a flow chart of a method of manufacturing the inductor according to the present disclosure. The first stage 301 is to from the first winding segment. This can advantageously be done through three-dimensional printing. The three-dimensional winding segment can be formed using any suitable form of 3D printing. The first winding segment may be formed from copper or aluminium or any other suitable material. The first winding segment may be formed within a mechanical support structure, which is created prior to the printing of the first inductor coil. The mechanical support structure can be made as part of the printing process and removed at a later stage. The mechanical support can also be formed through three-dimensional printing techniques. Once the first winding segment has been created the toroidal core can then be positioned in place on the first winding segment in step 302. A spacer may be added to the first winding segment prior to the positioning of the core; this allows for a spacing to be created between the first winding segment and the core. In step 303 the second winding segment is created. Further sections of the winding segment may also be produced if it the inductor is to be constructed of more than two sections. This second or further winding segments are created through three-dimensional printing. The second winding or further winding segments are formed from the same material as the first winding segment. The second or further winding segments may be formed separate to the first wining coil. The second or further winding segment can then be attached to the first winding segment using any standard process and in any suitable order of construction. Alternatively, the second or further winding segments may be printed directly onto the first winding segment. If a support structure has been used this may be removed and an insulating layer added to the first and second or further winding segments. The electrical connectors can be either added to the first and second winding coil. The point at which the electrodes are positioned next to a break in the winding. The final stage 304 is to pot and varnish the inductor such that can readily be used and attached to a circuit board or cooling plate. Once the device is formed the inductor can then be coupled to the electronic circuit. Additional electrical connections to those of the windings may be added. These further electrical connections will not form part of the electrical circuit but may be included as part of the mechanical design to balance the choke on the board, and to provide additional mechanical strength and extra thermal paths for cooling.

The first and second winding segments are created through three-dimensional printing. The use of three-dimensional printing allows for the windings to be tailored to suit the core or the purpose and the requirements of the device. Three-dimensional printing allows the first and second winding segments to be made from copper or aluminium or any other material amenable to the requirements e.g., Silver for low resistance, copper alloys for strength. Additionally, the printing technique allows for the use of any other suitable material. The shape of the fingers within the winding can be controlled, so as to allow for desirable properties of the invertor. Thus, the invertor is not limited by the availability of different wiring shapes and gauges, which is a limitation of prior art inductor devices. For example, the wiring used within the first, second and any further winding segments may be rectangular or may have a continuously varying cross-section rather than round. The rectangular winding may also feature bevelled edges with any appropriate bevelling values being chosen; this may be chosen with regard to the insulation coating process and the expected inter turn voltage. Alternatively, round wiring could be used. Or as shown in FIGS. 2*a* and 2*b* the windings can have a varying cross section so that they can cover a greater portion of the core. The first or second winding segments may be formed directly onto on the cold plate. Alternatively, the inductor device is manufactured away from the cold plate and then later connected to the cold plate via the electrical connectors of the winding being positioned onto electrode pads formed on the cold plate surface. The first and second winding segments may also be formed using a support structure into which they can be created. This support structure can later be removed by dissolving the support structure or by physically separating the winding segment from the support structure. The cold plate may be used for electrical connections to the inductors, it may not be a continuous structure, but may be in the form of a laminated copper busbar structure or other means of simultaneously providing separate electrical interconnects and heat transport. The cold plate may be located so as to achieve heat transport to the environment.

Figure 4:
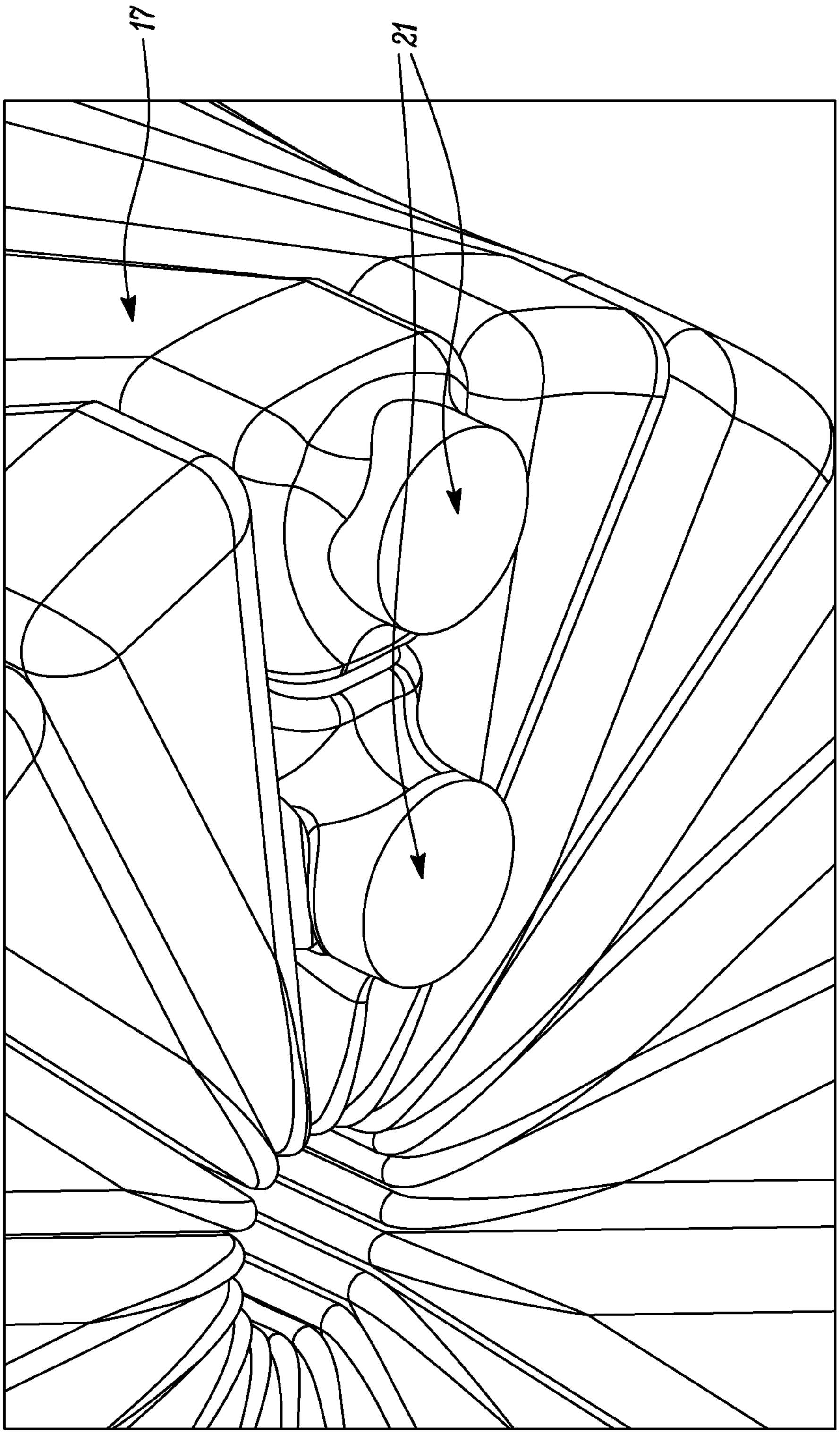
FIG. 4 presents an example of a pair of contact pads of the inductor according to an aspect of the present disclosure.

The inductor can be connected to the cooling pad or directly with other components within a circuit for example on to a circuit board. As the rating of an inductor is related to its temperature rise and therefore the ability of the component to dissipate heat. As such, the design of the connection for inductor to the heat sink or circuit board is crucial. As the windings are created through three-dimensional printing this allows the inductor to be formed directly onto the circuit board or heat sink, so as to maximise the contact area and thus increase the heat dissipation. Alternatively, the inductor can be connected to the circuit board or the cooling pad through the positioning of electrodes on the substrate. A connector can then be created on the first or second winding segments to allow it to attach to the electrode. The connector does not have to extend to the full width of the winding but can cover a smaller area. For example, the winding could have a round square or rectangular cross section. The area of the contact may for example be between 10-50 $mm^2$. The pad and the end of the connector of the winding can be plated in order to increase the solderability of the connector on the inductor to the electrode on the cold pad or the circuit board. As the skilled person would appreciate there are a number of suitable materials that can be used for the plating of the contacts. The configuration of the connectors is shown in FIG. 4. Here it can be seen that the connectors 21 extend away from the winding 17 to avow easy connection to the circuit board or cooling pad. The distance between the connectors and the winding may be between 100-1000 μm. The connectors are shown to have a round cross section.

The inductor core is placed into position relative to the first winding segment before the second winding segment is formed or connected to the first winding segment. The core may be positioned by features in the central support structure augmented by a coil insulation washer that will become a part of the final insulation system. A spacer may be used to position the core relative to the first and second winding such that a gap between the core and the winding is created. The gap between the winding core may be between 0.25 and 1.5 mm. The size as the skilled person will depend upon the voltage stress. The upper and radial gaps may be air or an insulating material such as epoxy, or silicone materials; these will be formed as part of a void free insulation system. In particular, the gap may be filled using Metal powders (MPP) etc, or Ferrites, or Amorphous strip toroid's, or Nickel or SiFe laminations. If laminations are used they may be laser cut to any shape and stacked to any height required The first and second winding segments may be printed having an insulation layer around them during the printing process for the first winding segment. Alternatively, the wiring may be created on a mechanical support structure that is removed before an insulating sleeve being added. The insulating layer can be formed from any suitable dielectric material.

The inductor can be used in any circuit requiring power conversion. However, it may be particularly suited for multi-phase networks, or for filter networks as well as interleaved battery charging.

It will be understood that the invention is not limited to the embodiments above-described and various modifications and improvements can be made without departing from the concepts described herein within the scope of the following claims.

I claim:

1. A filter inductor for a power generation converter; the filter inductor comprising:

a toroidal core and a conductive winding having a first connector and a second connector positioned at each end of the winding, wherein:

the conductive winding comprises at least first and second winding segments which are connected to each other so as to form a continuous winding around the toroidal core that extends from the first connector to the second connector;

an inner surface of the conductive winding that is positioned inside the toroidal core extends parallel to an axis of the toroidal core, and an outer surface of the conductive winding that is positioned outside the toroidal core includes a first part that extends parallel to the axis of the toroidal core, a second part that extends at an angle with respect to the axis of the toroidal core, and a third part that extends parallel to the axis of the toroidal core, wherein:

the first part is connected to one end of the second part, and the third part is connected to another end of the second part, and the third part is positioned more radially outward from the axis of the toroidal core than the first part is.

2. The filter inductor according to claim 1, wherein filter inductor is mounted upon a cold plate through the first and second connectors.

3. The filter inductor according to claim 2, wherein electrodes are provided on the cold plate and wherein the electrodes are electrically coupled to at least the first and second connectors of the inductor.

4. The filter inductor according to claim 1, wherein the conductive winding is made of aluminum or copper.

5. The filter inductor according to claim 1, wherein a material for the toroidal core is made of Glassy Metal, Silicon Iron, Nickel Iron.

6. The filter inductor according to claim 1, wherein a spacing is between the conductive winding and the toroidal core is between 0.25 and 1.5 mm.

7. The filter inductor according to claim 1, wherein the first and second connectors are contact pads, which are provided upon the first winding segment.

8. The filter inductor according to claim 7, wherein the contact pads are round pads.

9. The filter inductor according to claim 1, wherein the inductor is provided with stabilising pads.

10. The filter inductor according to claim 1, wherein there are a plurality of winding segments formed and linked to form multiple magnetically coupled inductors.

11. The filter inductor according to claim 1, wherein additional thermal and mechanical connections are added to the first and/or second segments.

12. The filter inductor according to claim 1, wherein an outer side of the conductive winding has a greater width than an inner side of the conductive winding closer to a center of the toroidal core.

13. The filter inductor according to claim 1, wherein an insulation layer is coated around the first and second winding segments.

14. The filter inductor according to claim 1, wherein edges of winding strips of the conductive winding are chamfered, and upper and radial gaps in the conductive winding are filled with an insulating material including epoxy or silicone material to form a void free insulation system of the filter inductor.

15. A method of forming a filter inductor for a power generation converter, the method comprising three-dimensional printing a first winding segment, positioning a conducting toroidal core within the first segment, then adding at least a second winding segment to contact the first winding segment so as to form a continuous winding around the conducting toroidal core, wherein an inner surface of the continuous winding that is positioned inside the toroidal core extends parallel to an axis of the toroidal core, and an outer surface of the continuous winding that is positioned outside the toroidal core includes a first part that extends parallel to the axis of the toroidal core, a second part that extends at an angle with respect to the axis of the toroidal core, and a third part that extends parallel to the axis of the toroidal core, wherein:

the first part is connected to one end of the second part, and the third part is connected to another end of the second part, and the third part is positioned more radially outward from the axis of the toroidal core than the first part is.

16. The method according to claim 15, wherein the addition of the at least second winding segment is done via three-dimensional printing of the at least second winding segment directly onto the first winding segment and the conducting toroidal core.

17. The method according to claim 15, wherein the addition of the at least second winding segment is done via the addition of a preformed three dimensional printed at least second winding segment onto the first winding segment and the conducting toroidal core.

18. The method according to claim 15, wherein the first and the at least second winding segments are formed from aluminium or copper.

19. The method according to claim 15, wherein the first winding segment is printed on a cold plate.

* * * * *